Dec. 30, 1930. D. PEPPER 1,786,629
CASTING MACHINE FOR BATTERY GRIDS
Filed June 4, 1929 7 Sheets-Sheet 1
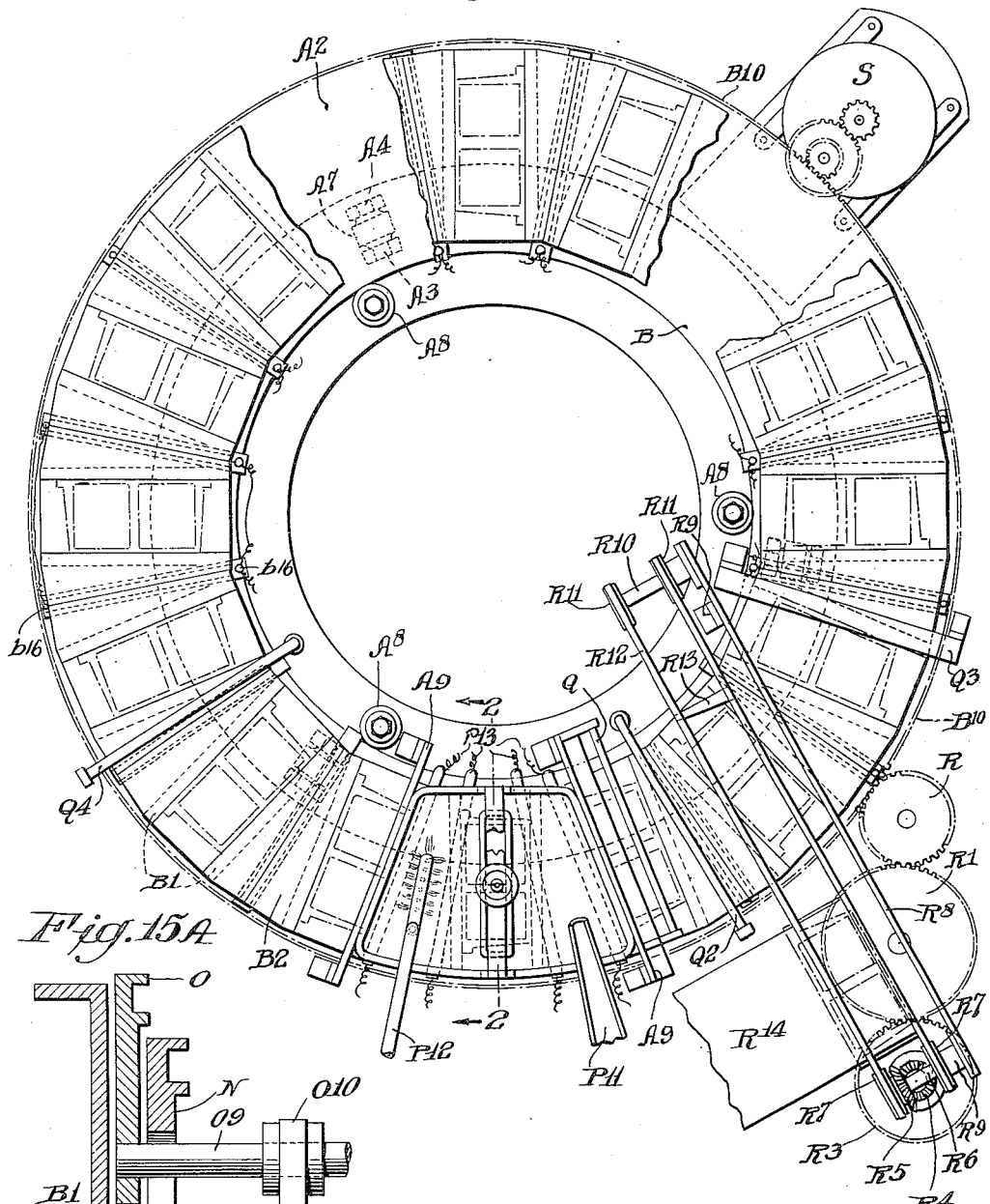
INVENTOR
DAVID PEPPER,
BY Francis J. Chambers
ATTORNEY

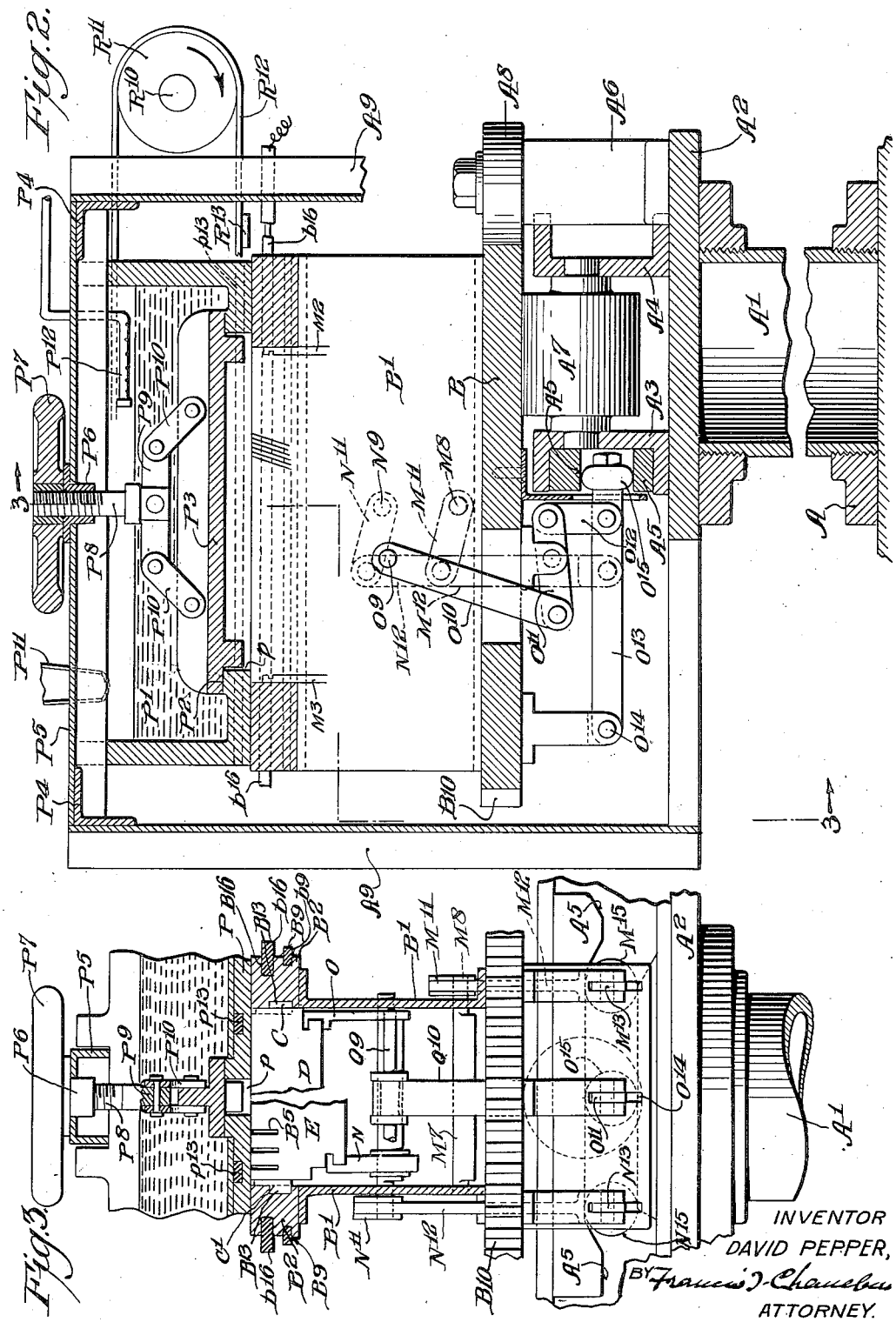

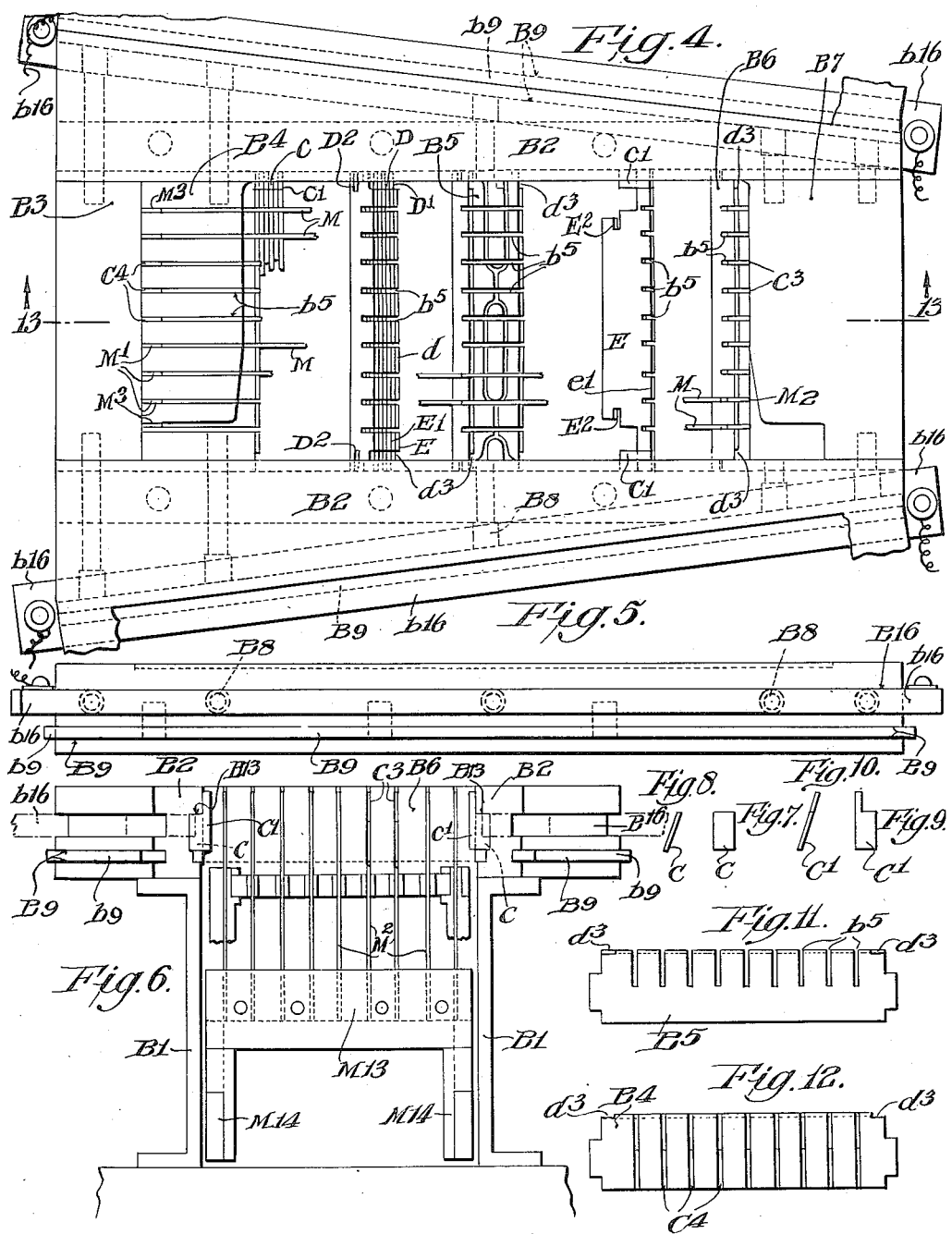

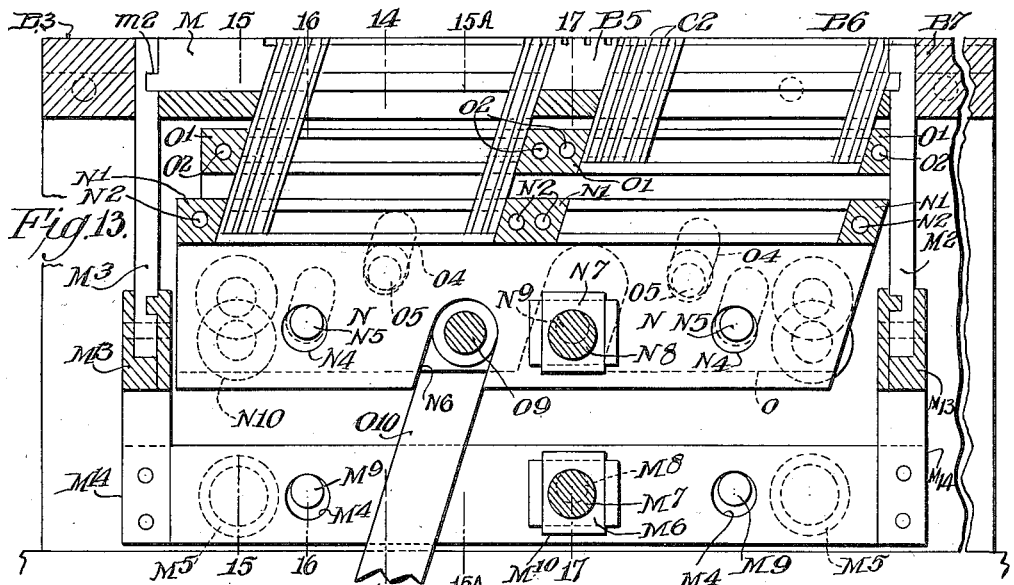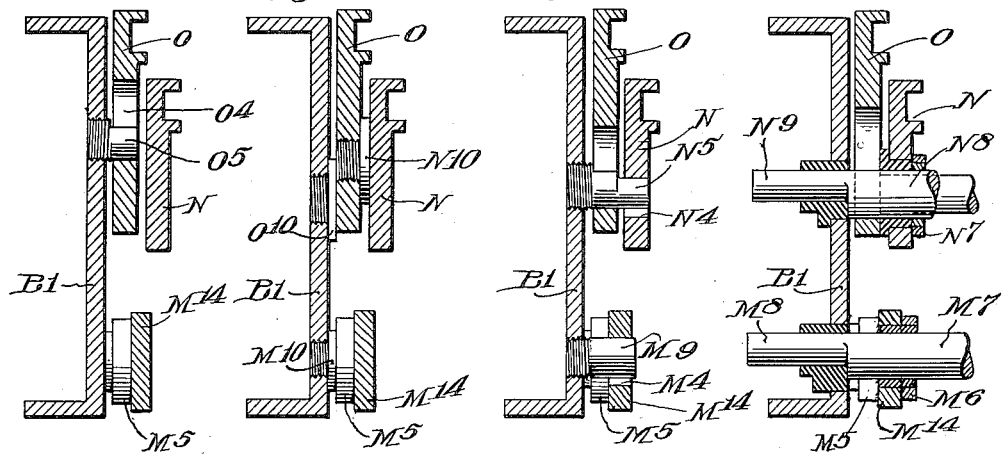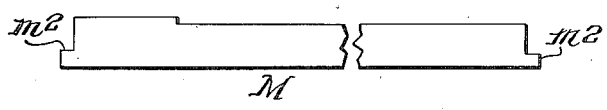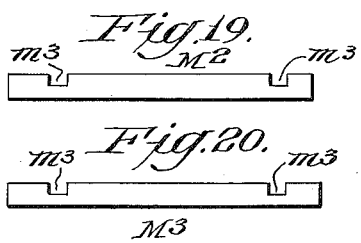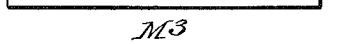

Dec. 30, 1930.   D. PEPPER   1,786,629
CASTING MACHINE FOR BATTERY GRIDS
Filed June 4, 1929   7 Sheets-Sheet 5
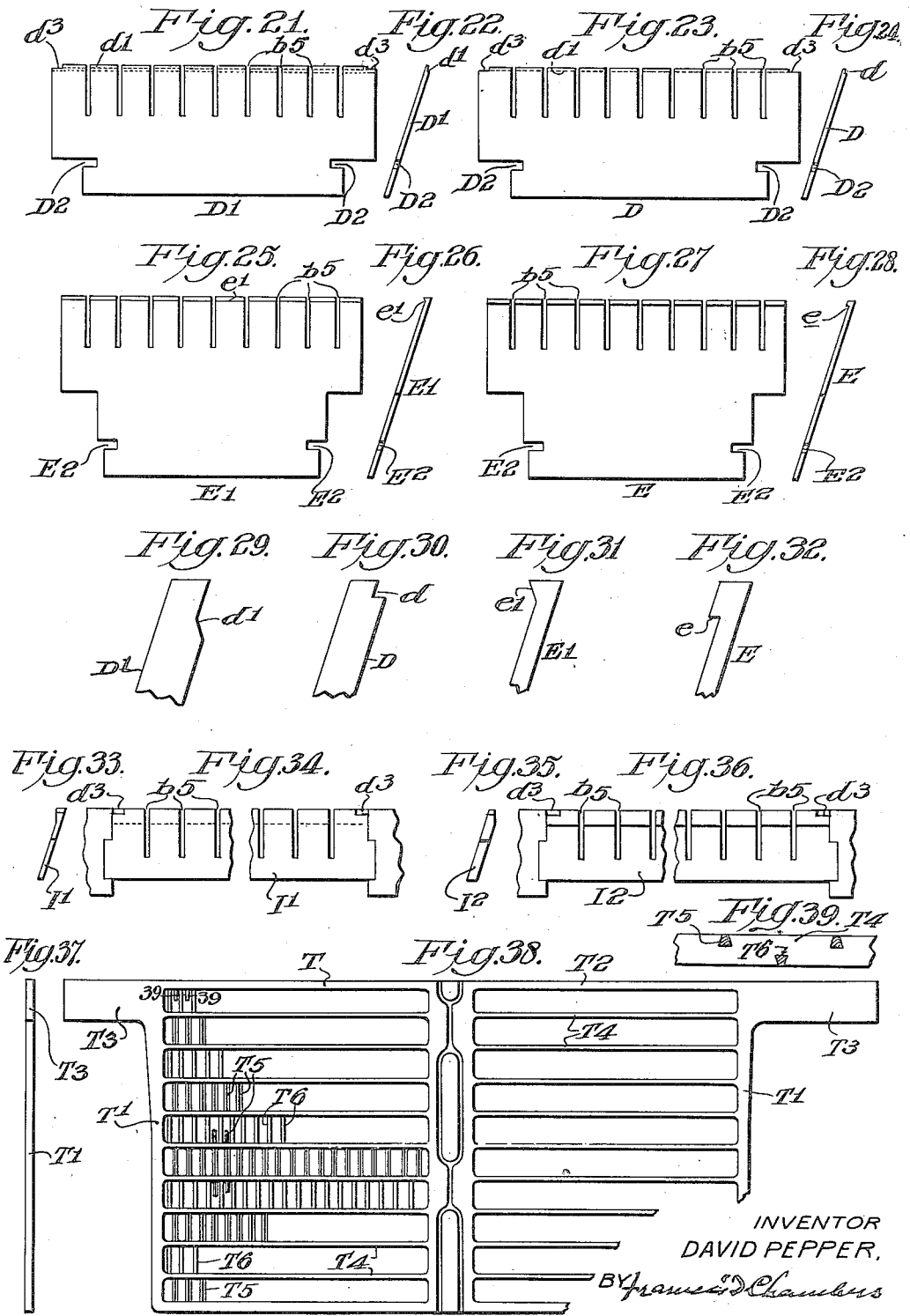
INVENTOR
DAVID PEPPER,
BY Francis D Chambers
ATTORNEY.

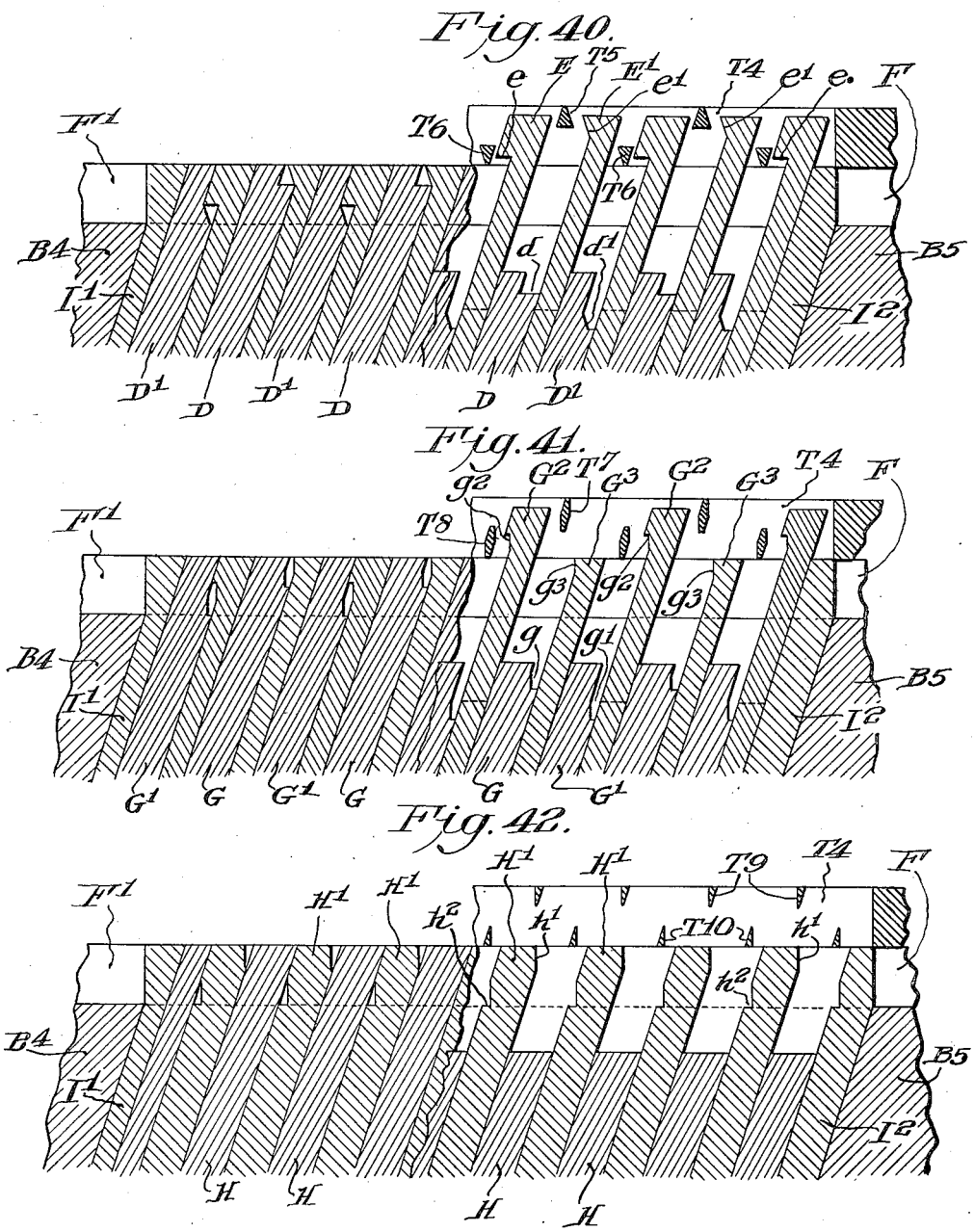

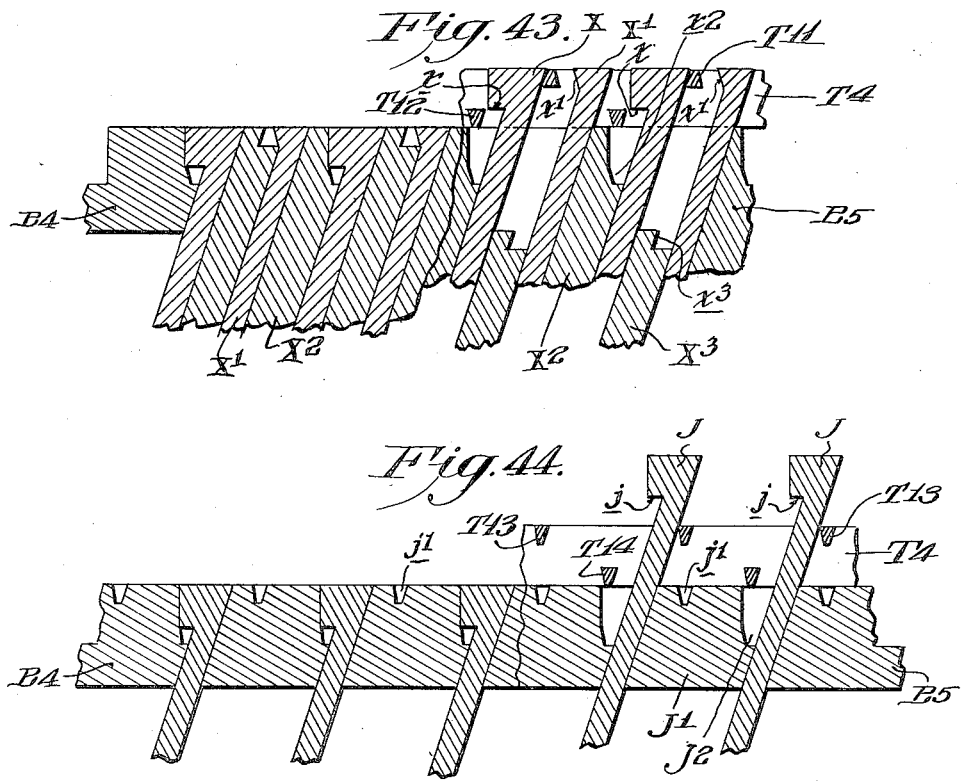
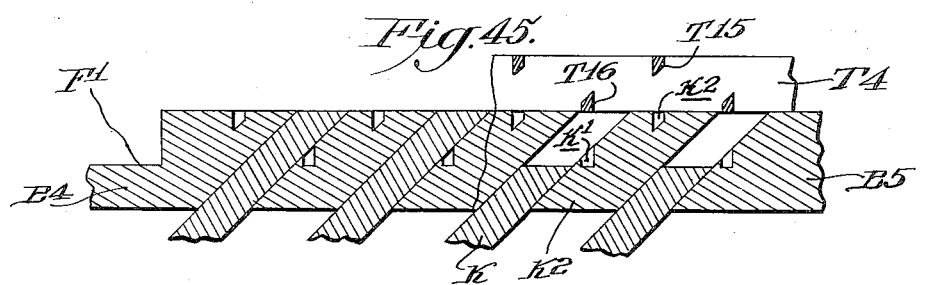
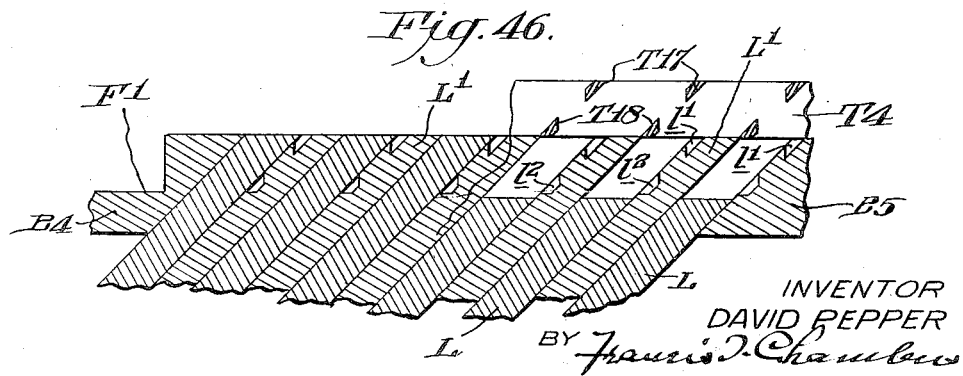

Patented Dec. 30, 1930

1,786,629

UNITED STATES PATENT OFFICE

DAVID PEPPER, OF PHILADELPHIA, PENNSYLVANIA

CASTING MACHINE FOR BATTERY GRIDS

Application filed June 4, 1929. Serial No. 368,212.

My invention relates to a casting machine especially designed for the casting of electric battery grids. The object of my invention is primarily to provide an open faced mold adapted for the casting of a grid of the type consisting of a frame, a series of primary ribs and a system or systems of secondary ribs, which mold will be adapted for very rapid casting. My invention has also for its object to provide a casting machine embodying as an element my novel mold and adapted as a whole for the rapid and accurate casting of battery grids. My invention consists in certain novel features of the mold and in various co-active features of the machine as a whole, all of which will be best understood as described in connection with the drawings in which they are illustrated and in which Figure 1 is a plan view of my improved casting machine with certain parts cut away to exhibit certain underlying features of construction.

Figure 2 is a cross section on an enlarged scale taken on the line 2—2 of Fig. 1 and showing the casting part, its valve and control, the mold proper, the rotary table and its supports and the cam mechanism for operating the mold plates and ejector plates.

Figure 3 is a sectional view taken on the line 3—3 of Fig. 2, showing the heating elements within the casting pot, the valve and its control, the mold and support, the rotary table (in elevation) the cams and cam arms for operating the mold plates and ejectors.

Figure 4 is a plan view of one of the casting molds, showing the movable casting plates in fragment.

Figure 5 is a side elevation of the upper part of Fig. 4.

Figure 6 is an end view of Fig. 4 with the end piece of the mold removed looking from the center of the casting table and clearly showing the ejectors.

Figure 7 is a side view of a bearing plate for "down plate".

Figure 8 is an end view of a bearing plate for "down plate".

Figure 9 is a side view of a bearing plate for "up plate".

Figure 10 is an end view of a bearing plate for "up plate".

Figure 11 is a side view of a main structure center piece.

Figure 12 is a side view of a main structure end piece.

Figure 13 is a section on the line 13—13 of Fig. 4, showing the frame of a casting mold, the ejectors and cams for operating the same, the mold plates and the cams for operating them.

Figure 14 is a section on the line 14—14 of Fig. 13.

Figure 15 is a section on the line 15—15 of Fig. 13.

Figure 15a is a section on the line 15a, 15a, of Fig. 13.

Figure 16 is a section on line 16—16 of Fig. 13.

Figure 17 is a section on line 17—17 of Fig. 13.

Figure 18 is a face view of one of the top ejector plates.

Figure 19 is a face view of one of the innermost ejector stems.

Figure 20 is a face view of the outermost ejector stem.

Figure 21 is a face view of the down plate for casting the lower rib.

Figure 22 is an end view thereof.

Figure 23 is a face view of the "down" plate for casting the upper rib.

Figure 24 is an end view thereof.

Figure 25 is a face view of the "up" plate for casting the upper rib.

Figure 26 is an end view thereof.

Figure 27 is a face view of the "up" plate for casting the lower rib.

Figure 28 is an end view thereof.

Figure 29 is an enlarged upper end view of Fig. 22.

Figure 30 is an enlarged upper end view of Fig. 24.

Figure 31 is an enlarged upper end view of Fig. 26.

Figure 32 is an enlarged upper end view of Fig. 28.

Figure 33 is an end view of the outer fixed end plate of the casting mold.

Figure 34 is a face view thereof.

Figure 35 is an end view of the inner fixed end plate of the casting mold.

Figure 36 is a face view thereof.

Figure 37 is an end view of the casting (the product).

Figure 38 is a plan view showing the solid frame surrounding the long or primary ribs and secondary cross ribs, the latter being in two different planes hereinbefore referred to as upper and lower ribs.

Figure 39 is an enlarged section on the line 39–39 of Fig. 38 showing the relative spacing and the shapes of the cross ribs.

Figures 40 to 44 inclusive are enlarged detail sections of a series of casting plates in their relative positions in the mold, the left hand end showing the position when the mold is empty and ready to receive metal and the right hand end showing the casting having been made, the plates moved into their releasing position and the casting lifted out of the mold by the ejector to the position ready for removal. Each of these figures shows a different combination of the relatively movable showing still other modifications of the com- Figures 45 and 46 are views of a generally similar character to those of Figs. 40 to 44 showing still other modifications of the combination of the relatively movable plates forming the body of the mold.

A is the base plate; $A^1$ supports rising from this plate and supporting an annular table indicated at $A^2$. A series of roller supports indicated at $A^3$ and $A^4$ are secured to the table $A^2$ as shown in Fig. 2 and supporting a series of rollers $A^7$ and as shown in Fig. 2 the portion $A^3$ has also formed in or secured to it a cam path, indicated at $A^5$. These roller supports support the horizontal rolls $A^7$ and other roller supports indicated at $A^6$ support the vertically pivoted rollers indicated at $A^8$. B indicates an annular table supported on the rollers $A^7$ and guided in a rotating path by the rollers $A^8$. $B^1$, $B^1$ indicate a series of channels supported on the table B and supporting in turn the side walls of the mold indicated at $B^2$. These side walls are of such shape that when the series of molds is supported on the channels $B^1$ the outer faces of the side walls of adjacent molds abut against each other on lines radial to the center of the table while the faces of each pair of side walls are parallel to each other. The abutting outer faces of the side walls, as is best shown in Fig. 3, are grooved as indicated at $B^9$ and $B^{16}$, $b^9$ indicating a key fitting in adjacent grooves $B^9$ and a heating element indicated at $b^{16}$ is shown fitting in adjacent grooves $B^{16}$. A longitudinal groove $B^{13}$ is formed on the outer face of the side walls and serves to support a number of elements making up the mold. Among these elements are cross pieces indicated at $B^3$ which extend up flush with the open face of the mold. $B^4$, also supported in the groove $B^{13}$, is a cross piece forming the end of the mold proper. $B^7$ is a cross piece similar to $B^3$ forming an end piece for the mold structure but not for the mold proper except in so far as a cavity for the casting of the lug of the plate is formed in it. $B^6$ is a cross piece forming the opposite end of the mold proper to the cross piece $B^4$ and $B^5$ is a cross piece adaptable when a double plate casting is made similar to that shown in Fig. 38. $B^8$ indicate the bolts used for fastening the cross pieces to the side pieces of the mold. The cross bars $B^4$, $B^5$ and $B^6$ are all provided with parallel vertical slots indicated at $b^5$ and adapted to receive the lifter or ejector plates to be described and the cross bars $B^4$ and $B^6$ are also provided on their outer faces with vertical slots indicated at $C^4$ and $C^3$ through which move the vertical members which raise and lower the ejector plates, the central part of the mold lying between the cross pieces $B^4$ and $B^5$ and between $B^5$ and $B^6$ are made up of relatively movable plates which it is necessary should have a fairly close sliding fit with each other but not a binding fit. Where some of these plates are stationary, as in the modifications shown in Figs. 41, 42, 43, 45 and 46, they will be rigidly secured in properly spaced relation to the side plates of the mold and will serve as the spacers for the movable plates. In such a modification as that shown in Fig. 40, I employ the guides and spacers indicated in Figs. 7, 8, 9 and 10, in which spacers indicated at C are secured in the slots $B^{13}$ of the slide bars at a proper angular inclination and come practically flush with the outer edges of the slot and alternating with these spacers are the spacers $C^1$ which are of an L shape, as shown in Figs. 9 and 10 and project beyond the edges of the slot by an amount equal to the width of the frame of the casting; the upward projections of these spacers serving as a part of the mold for the frame.

Referring to the mold construction illustrated in Fig. 40, D and $D^1$ indicate two series of sliding retractable plates forming part of the mold and E, $E^1$, etc. indicate two series of upwardly moving sliding plates disposed with reference to the plates D and $D^1$, as shown in Fig. 40. In this construction the plates D and $D^1$ fit between the outwardly extending portions of the spacers $C^1$ and practically against the edges of the spacers C. The plates E and $E^1$ are spaced by the plates D and $D^1$ and fit against the outwardly extending edge of the spacer $C^1$. Along the edges of the plates D and $D^1$ are formed notches indicated at $d^3$ which form a part of the mold cavity for the casting of the frame of the grid. All of the relatively movable plates D, $D^1$ and E, $E^1$ are formed with a series of parallel vertical slots or mold cavities indicated at $b^5$. These cavities form a mold chamber for the casting of the primary ribs of the grid and are made deeper than the casting to receive the ejector plates, the top edges of which when retracted in the slots form the bottom of the mold cavity. In the construction shown in Fig. 40 and on a larger scale indicated in Figs. 29 to 32 inclusive, the mold cavities for the upper series of secondary or cross ribs are formed between mold cavities $d$ in the plates D and the projections $e^1$ of the plates $E^1$. The mold cavities for the lower series of secondary or cross ribs are formed between the notches $d^1$ of the sliding plates $E^1$ and the projections $e$ of the sliding plates E.

The formation of the lower part of the plates D, $D^1$ and E, $E^1$ is best shown in Figs. 21 to 28 inclusive. These lower projections are notched as shown at $D^2$ and $E^2$ and by means of these notches are secured to frames which will be hereafter described. At F and $F^1$, Figs. 40, 41 and 42, I have indicated the mold cavity for the casting of the ends of the grid frame, these cavities being formed on the plates $B^4$, $B^5$ and $B^6$ and bounded on their edge by stationary plates indicated at $I^1$ and $I^2$ which I have shown as separate plates but which might form a part of the same structures as the cross bars against which they abut. In the construction shown in Figs. 43, 44, 45 and 46, these mold cavities are formed in the cross bars $B^4$. In this construction of mold, as indicated at $T^5$ and $T^6$, $T^4$ indicates a primary rib.

In the modification shown in Fig. 41, the series of plates $G^3$ are stationary and the two series of plates marked G and $G^1$ are movable. The series of plates marked G are downwardly movable and the series of plates marked $G^2$ are upwardly movable. The mold cavities for the upper series of secondary cross bars are formed in the cavity $g$ at the upper end of the plates G and between it and the projecting edge $g^3$ at the upper end of the plates $G^3$ and the cavities for the lower series of cross bars are formed between the cavities $g^1$ at the top of the plates $G^1$ and the projections $g^2$ at the top of the plates $G^2$. The form of the secondary ribs is indicated at $T^7$ and $T^8$ in Fig. 41.

In the modification shown in Fig. 42, the plates H are attracted and moved between stationary plates indicated at $H^1$. The cavities for the upper and lower rows of secondary ribs are indicated at $h^1$ and $h^2$ and the form of the secondary ribs is indicated at $T^9$ and $T^{10}$.

In the construction shown in Fig. 43 there are two series of upwardly moving plates indicated at X and $X^1$ and a series of downwardly moving plates indicated at $X^3$ and a series of stationary plates indicated at $X^2$. The cavities for casting the cross bars are formed between the notches and projections indicated at $x$, $x^1$, $x^2$ and $x^3$ and the form of the grid cross bars of the upper and lower series is indicated at $T^{11}$ and $T^{12}$.

In the construction shown in Fig. 44, J, J indicate upwardly sliding plates moving between fixed plates or bars indicated at $J^1$, the cavities for the formation of the upper row of secondary ribs are formed in the portions $J^1$ as indicated at $j^1$ and these stationary parts have also notches $j^2$ formed in them which form the cavities for the lower series of secondary ribs in connection with the projections $j$ of the sliding plates J. The secondary ribs cast in this form of mold are indicated at $T^{13}$ and $T^{14}$.

In the construction shown in Fig. 45, K, K etc. indicate a series of downwardly sliding plates. These plates move between stationary plates or bars indicated at $K^2$ in which are formed notches $k^2$ for the formation of the upper series of secondary ribs and $k^1$ for the formation of the lower series of secondary ribs. The form of the secondary ribs cast in this modification are indicated at $T^{15}$ and $T^{16}$.

In the construction shown in Fig. 46, the inside of the mold is made up of retractable sliding plates L moving between stationary plates $L^1$ the mold cavities being formed as indicated by the notches $l^1$ and $l^2$ and the form of the ribs indicated at $T^{17}$ and $T^{18}$.

Referring next to the ejector plates and the mechanism for raising and lowering them these parts are best shown in Figs. 2 and 13 to 20 inclusive. M indicates one of the ejector plates, one of which lies in each of the series of parallel mold cavities adapted for the casting of the primary ribs of the grid. These plates as shown are provided with projecting lugs $m^2$, see Figs. 13 and 18, which are engaged by one of the notches $m^3$ of plates such as $M^2$ and $M^3$, Figs. 19 and 20, one of which is located in each one of the vertical slots $C^3$ and $C^4$. The notches at the lower ends of the plates $M^2$ and $M^3$ are engaged, as shown in Fig. 13, by cross bars $M^{13}$, which in turn are connected with cross bars $M^{14}$. These cross bars contact with rubbing or bearing studs indicated at $M^5$ and are provided with perforations $M^4$ through which extend studs indicated at $M^9$ forming abutments to limit the up and down movement of the cross bar. There is also formed in the plates $M^{14}$ slots indicated at $M^{10}$ in which move bearing blocks $M^6$ surrounding an eccentric $M^7$ secured to a shaft $M^8$, this shaft having a bearing in the channel $B^1$ as indicated in Fig. 17. It will be obvious that as the eccentric rotates the cross bars $M^{14}$ and the ejector plates connected with them as described are raised and lowered. The shafts $M^8$ are connected by lever arms $M^{11}$, see Fig. 2, which lever arms are connected by links $M^{12}$ with the pivoted lever arm indicated at $N^{13}$ in Fig. 3. This lever arm which is practically a duplicate of lever arm $O^{13}$ of Fig. 2, carries at its end a cam roller indicated at $N^{15}$, which runs in the slot $A^5$.

Passing next to the frames for actuating the sliding plates used in the construction of the inner portion of my mold I would state that the construction shown in detail in Figs. 13 to 17 inclusive relate specifically to the mechanism shown in Fig. 40 and the sliding plates used in this modification and shown in Figs. 21 to 32. The notched edges of the movable plates indicated in Figs 21 to 24 are engaged by the notched side plates indicated at O, in Figs. 14 to 17 and the notched ends of the plates shown in Figs. 25 to 28 inclusive are engaged by the notched bars indicated at N in the same figures. The pairs of bars between which the notched edges of the sliding plates are secured together by cross bars $O^1$ and $N^1$ and bolts $O^2$ and $N^2$ form rigid frames. The cross bars O are spaced from the channels $B^1$ by washers indicated at $O^6$ in Fig. 15 and are formed with slots $O^4$ through which pass pins $O^5$ which limit the upward movement of the bars O and the attached sliding plates. Up and down motion is imparted to the frame of which the cross bars O form a part through a shaft $O^9$ to which is pivotally connected a link $O^{10}$ the lower end of which is pivotally connected to a pivot lever $O^{11}$ connected by a link $O^{12}$ with a pivot lever $O^{13}$ which lever is pivoted to a fixed pivot $O^{14}$ and carries at its free end a cam roller $O^{15}$ running in the cam grooves $A^5$. The cross bars N which engage the notched ends of the slides E and $E^1$ of the construction shown in Fig. 40, are spaced and secured together by the bars indicated at $N^1$ and bolts indicated at $N^2$. Stop studs indicated at $N^5$ extend through perforations $N^4$ in the bars N. The lower part of the bars N are slotted as indicated at $N^6$ to give passage to the rod $O^9$. $N^7$ indicates slide blocks moving in horizontal slots on the bar N and surrounding eccentrics $N^8$ formed on the ends of shafts $N^9$. $N^{10}$ indicate rubbing plates or washers intervening between the bars N and O and attached to O. The shafts $N^9$ are given a locking motion through the lever $N^{11}$ which is connected by a link $N^{12}$ to a lever $N^{13}$, see Fig. 3, the lever being similar to and lying directly back of the lever $O^{13}$ shown in Fig. 2 and carrying at its end a cam roller $N^{15}$ which runs in the cam slot $A^5$.

P indicates the cover plate under which the open faced molds move and which in the construction shown forms the bottom of the metal holding pot and is formed with a slotted opening $p$ extending the width of the mold through which metal from the pot is permitted to flow into the mold and $P^1$ indicates the molten metal in the pot. On the upper side of this cover plate or pot bottom is formed the seat $P^2$ with a valve indicated at $P^3$. The pot rests in gravital contact with the molds and is anchored in its position by means of the framing indicated at $P^4$ and $P^5$, this framing being secured to upright struts of the main frame of the machine indicated at $A^9$. $P^7$ indicates a hand wheel for raising and lowering the valve $P^3$. The shaft $P^8$ of this wheel is threaded and extends through a threaded bushing indicated at $P^6$ the lower end of the shaft being attached to the equalizing bar $P^9$ connected by the links $P^{10}$, $P^{10}$ to the valve $P^3$. $P^{11}$ is the spout through which metal is fed to the pot. $P^{12}$ indicates a gas burner located in the upper part of the pot for keeping the metal sufficiently hot. $p^{13}$ indicates electric heating elements located in the cover plate or pot bottom and connected with a source of electricity through the wires indicated at $P^{13}$ in Fig. 1.

Referring now to Fig. 1, Q indicates a scraper located immediately in front of the pot and functioning to scrape the open face of the mold just before it passes beneath the cover plate. $Q^2$ indicates an oil spray located immediately in front of the scraper Q and having for its purpose to lubricate the open face of the mold very shortly before it passes beneath the cover plate and $Q^3$ is a second scraper so located in the path of travel of the molds as to operate on the face of the mold before it is opened by the relative movements of the sliding plates and $Q^4$ indicates a cooling device, for instance a water spray or air jet, for cooling the plates of the molds after they have received the casting. The mechanism for opening and closing the mold by the proper relative movements of the plates making up the center of the mold is located between $Q^3$ and $Q^2$ but is not shown in Fig. 1 on account of the great reduction of this plan view of my apparatus.

The mechanism indicated in Fig. 1 for removing the castings after they have been raised from the mold by the lifting ejector plates and after the sliding plates, if any, which move upward have been retracted, is actuated by a gear R engaged with the peripheral gear $B^{10}$ and engaging an intermediate gear $R^1$ which drives a gear $R^3$. To this gear is attached the miter wheel indicated at $R^4$ which drives a bevel gear $R^5$ attached to a shaft $R^6$ and carrying at its end sprocket wheels indicated at $R^7$. Supported on the struts $R^9$ $R^9$ is the frame $R^8$ which supports at its inner end the shaft $R^{10}$ on which are secured the sprocket wheels $R^{11}$. Over the sprocket wheels $R^7$ and $R^{11}$ move the sprocket chains $R^{12}$ which are provided with cross bars $R^{13}$ which engage the castings and sweep them on a conveyor $R^{14}$.

At S I have indicated the motor which actuates the rotating table.

Figs. 37, 38 and 39 illustrate the double grid casting which is the form of casting my machine is especially adapted to make. The casting T is provided with side walls $T^2$ and end walls $T^1$ from which end walls extend the lugs $T^3$. A system of parallel primary ribs indicated at $T^4$ extend between the end walls and a double system of secondary ribs indicated at $T^5$ and $T^6$ placed in staggered relation to each other, as best shown in Fig. 39, extend transversely to the primary ribs as shown at the left hand side of Fig. 38. In operation and before any casting operation is undertaken the series of molds are brought to a proper temperature by means of the electric heaters located in their side walls, the temperature being but slightly below the hardening point of the metal. The cover plate P forming the bottom of the pot is also heated partly by molten metal poured into the pot, the valve of which is then closed and partly by the electric heaters located in the cover plate the temperature of the cover plate should be at or slightly higher than that of the molten metal. The parts being properly heated as described, the mold table carrying the series of molds which should have been in operation during the preheating of the parts, brings each mold immediately before it passes beneath the cover plate beneath the oiling device indicated in Fig. 1 at $Q^2$ the mold slides being in closed position when the oil is applied. The valve of the metal containing pot is raised or opened so that as the mold passes beneath the slot in the cover plate its open face receives molten metal from the pot filling all the mold cavities. The speed of passage of the mold beneath the cover plate is of course regulated to give proper time for the flow of the metal to fill all mold cavities and should be at a rate approximating the rate of flow of metal in the larger cavities so that the cavities for the primary ribs are filled from their tops rather than by lateral flow from the framing part of the casting. The speed of travel of the molds is also such that the upper surface of the casting in contact with the cover plate does not set until after the mold has passed from beneath the cover plate. This is quite important to prevent pulling of the metal by adhesion to the cover plate. After passing from beneath the cover plate the charged mold is cooled by the water or air spray located at $Q^4$, if desired, or its cooling may be left to exposure to the air during its considerable path of travel. Immediately before the slides are actuated to open the mold the mold is passed beneath the scraper $Q^3$ which scrapes off any films which may extend from the casting. Then the molds come into registry with the mechanism for actuating the relatively movable plates making up the central part of the mold. These plates are of such thickness and disposed at such an angle to the horizontal that when the sliding plates are actuated they leave a clear vertical path for all parts of the casting to move upward out of the mold. This is indicated in all of the different modifications illustrated in the drawings. Immediately after the opening of the mold by the sliding of the movable plates the lifter or ejector mechanism comes into operation. The lifter plates, the upper edges of which form the bottoms of the mold cavities for the primary ribs, lift the casting completely out of the mold following which any sliding plates which have moved upward to free the castings are retracted and following this the castings are engaged by the cross bars $R^{13}$ carried by the cross bars $R^{12}$ and swept off by the conveyor $R^{14}$. At or before the removal of the casting all parts of the mold are shifted to closed position and are lubricated by the device indicated at $Q^2$ and scraped by the scraper indicated at Q before it passes beneath the cover plate to receive another charge of metal.

Having now described my invention, what I claim as new and desire to secure by Letters Patent, is:

1. An open faced mold for casting electric battery grids consisting of a frame, a system of primary ribs and a system of secondary ribs, said mold having a frame, a body portion located within said frame and made up of a series of plates inclined to the plane of the open face of the mold and alternately relatively movable with respect to adjacent plates, said plates having formed in their upper ends a series of vertical mold cavities which cavities extend transversely across the series of adjacent plates for casting the primary ribs of the grid and said plates being so conformed that when the mold is closed there is formed between adjacent plates mold cavities opening at their ends into the cavities provided for forming the primary ribs for forming a series of secondary ribs of the grid, the shape of the mold cavities for the secondary ribs and the thickness and inclination of the series of plates being such that when the mold is opened by moving the plates relatively to each other the casting can be freely lifted from the mold.

2. A mold having the features of claim 1 in which the mold cavities for forming the system of primary ribs are made deeper than the ribs to be formed and combined with a series of lifting plates which in retracted position form the bottom of such mold cavities.

3. In a mold having the features of claim 1 the provision of guideways for the edges of the sliding plates located so as to hold the sliding plates out of binding contact with the adjacent plates making up the body of the mold.

4. In combination with a mold having the features of claim 1 and having also a series of vertically movable lifter plates located in the cavities for the casting of the primary ribs, an angularly guided frame or frames to which the movable plates are attached and a vertically guided frame to which the lifter plates are attached.

5. In combination with a mold having the features of claim 1, a relatively slidable cover plate for closing the open face of the mold provided with a metal pouring slot through which metal is introduced into the mold as it moves beneath the cover plate.

6. An open faced mold for casting electric battery grids in which the mold cavities are formed partly in the face of and partly between a series of overlapping angularly set and relatively movable plates and in which the mold is opened to release the casting by a relative movement of alternate plates in combination with a cover plate relatively movable with respect to the mold, having a pouring slot for feeding metal to the mold as it passes beneath the cover plate and means for heating said cover plate and through it the top surface of the mold when in contact therewith.

7. An open faced mold for casting electric battery grids consisting of a frame, a system of primary ribs and a system of secondary ribs, said mold having a frame, a body portion located within said frame and made up of a series of plates inclined to the plane of the open face of the mold and alternately relatively movable with respect to adjacent plates, said plates having formed in their upper ends a series of vertical mold cavities which cavities extend transversely across the series of adjacent plates for casting the primary ribs of the grid and said plates being so conformed that when the mold is closed there is formed between adjacent plates mold cavities opening at their ends into the cavities provided for forming the primary ribs for forming a series of secondary ribs of the grid, the shape of the mold cavities for the secondary ribs and the thickness and inclination of the series of plates being such that when the mold is opened by moving the plates relatively to each other the casting can be freely lifted from the mold, in combination with a relatively slidingly movable cover plate provided with a metal pouring slot through which the molds receive metal as they successively register with the plate, said machine comprising also means for actuating the sliding plates to open the molds at a certain point in their travel when they are no longer covered by the cover plate.

8. In a casting machine having the features of claim 7 in which the molds are provided with lifter plates located in the primary rib cavities, the provision of means for actuating the lifter plates to raise the casting from the mold located to operate said lifters at a point in the travel of the molds after the mold has been opened.

9. In a casting machine having the features of claim 7, means for lubricating the face of the open mold located in advance of the cover plate whereby the mold is lubricated before passing beneath said cover plate.

10. In a casting machine having the features of claim 7 the combination therewith of means for heating the series of molds spaced between and in contact with adjacent molds of the series.

11. In a casting machine having the features of claim 7 and having also means for opening the mold and ejecting the casting therefrom, the combination therewith of means for scraping the face of the filled open mold located between the mold opening means and the casting ejecting means.

12. In a casting machine having the features of claim 7 and having also means for successively opening the molds and ejecting the casting therefrom, the combination therewith of means for cooling the casting operative at a point in the travel of the series of molds before the molds' opening mechanism comes into operation.

13. In a casting machine having the features of claim 7, the combination therewith of means for heating and drying the face of the open faced molds located to operate thereon immediately before they pass beneath the cover plate.

14. In a casting machine having the features of claim 7 and having also successively acting means for opening the mold and ejecting the casting therefrom, the combination therewith of means for removing the castings from the ejecting mechanism.

DAVID PEPPER.